(12) United States Patent
Okazaki et al.

(10) Patent No.: US 7,781,101 B2
(45) Date of Patent: Aug. 24, 2010

(54) ELECTRODE FOR NONAQUEOUS ELECTROLYTE SECONDARY BATTERY, METHOD FOR PRODUCING SAME, AND NONAQUEOUS ELECTROLYTE SECONDARY BATTERY COMPRISING SUCH ELECTRODE FOR NONAQUEOUS ELECTROLYTE SECONDARY BATTERY

(75) Inventors: Sadayuki Okazaki, Osaka (JP); Kazuyoshi Honda, Osaka (JP); Masaya Ugaji, Osaka (JP)

(73) Assignee: Panasonic Corporation, Osaka (JP)

( * ) Notice: Subject to any disclaimer, the term of this patent is extended or adjusted under 35 U.S.C. 154(b) by 4 days.

(21) Appl. No.: 11/994,562

(22) PCT Filed: Feb. 13, 2007

(86) PCT No.: PCT/JP2007/052507

§ 371 (c)(1),
(2), (4) Date: Jan. 3, 2008

(87) PCT Pub. No.: WO2007/094311

PCT Pub. Date: Aug. 23, 2007

(65) Prior Publication Data

US 2009/0117462 A1    May 7, 2009

(30) Foreign Application Priority Data

Feb. 14, 2006    (JP) .............................. 2006-036279

(51) Int. Cl.
*H01M 4/58*    (2010.01)

(52) U.S. Cl. .................................................. 429/218.1

(58) Field of Classification Search .................. 429/245
See application file for complete search history.

(56) References Cited

U.S. PATENT DOCUMENTS 6,432,579 B1    8/2002    Tsuji et al.
7,192,673 B1    3/2007    Ikeda et al.

(Continued)

FOREIGN PATENT DOCUMENTS

JP    11-135115    5/1999

(Continued)

OTHER PUBLICATIONS

European Search Report issued in European Patent Application No. 07 71 4089.5 dated Oct. 1, 2009.

*Primary Examiner*—Patrick Ryan
*Assistant Examiner*—Ashley Kwon
(74) *Attorney, Agent, or Firm*—McDermott Will & Emery LLP

(57) ABSTRACT

An electrode for a non-aqueous electrolyte secondary battery 6 according to the present invention includes: a current collector 3; a first active material layer 2 formed on the current collector 3; and a second active material layer 5 provided on the first active material layer 2, the second active material layer 5 including a plurality of active material particles 4. The plurality of active material particles 4 is mainly of a chemical composition represented as $SiO_x$ ($0 \leq x < 1.2$). The first active material layer 2 is mainly of a chemical composition represented as $SiO_y$ ($1.0 \leq y < 2.0$, $y > x$). The area in which the first active material layer 2 is in contact with the plurality of active material particles 4 is smaller than the area in which the current collector 3 is in contact with the first active material layer 2.

7 Claims, 8 Drawing Sheets

U.S. PATENT DOCUMENTS

| | | |
|---|---|---|
| 2002/0177044 A1 | 11/2002 | Yagi et al. |
| 2003/0027050 A1 | 2/2003 | Okamoto et al. |
| 2003/0138554 A1 | 7/2003 | Yagi et al. |
| 2004/0142242 A1* | 7/2004 | Kawase et al. .............. 429/245 |
| 2005/0048369 A1* | 3/2005 | Koshina et al. .......... 429/218.1 |
| 2005/0074671 A1 | 4/2005 | Sugiyama et al. |
| 2005/0118503 A1 | 6/2005 | Honda et al. |
| 2005/0153208 A1 | 7/2005 | Konishiike et al. |
| 2006/0099507 A1* | 5/2006 | Kogetsu et al. .......... 429/218.1 |
| 2006/0134518 A1 | 6/2006 | Kogetsu et al. |
| 2006/0159997 A1 | 7/2006 | Sunagawa et al. |
| 2007/0031733 A1 | 2/2007 | Kogetsu et al. |
| 2007/0207386 A1* | 9/2007 | Konishiike et al. .......... 429/232 |

FOREIGN PATENT DOCUMENTS

| | | |
|---|---|---|
| JP | 11-339777 | 12/1999 |
| JP | 2002-083594 | 3/2002 |
| JP | 2002-319408 | 10/2002 |
| JP | 2002-373644 | 12/2002 |
| JP | 2003-217576 | 7/2003 |
| JP | 2003-303586 | 10/2003 |
| JP | 2004-127561 | 4/2004 |
| JP | 2005-141991 | 6/2005 |
| JP | 2005-196970 | 7/2005 |
| JP | 2005-293899 | 10/2005 |
| JP | 2005-332797 | 12/2005 |
| JP | 2006-073212 | 3/2006 |
| JP | 2006-107912 | 4/2006 |
| JP | 2006-196447 | 7/2006 |
| JP | 2006-269306 | 10/2006 |
| JP | 2006-278104 | 10/2006 |
| JP | 2006-284918 | 10/2006 |
| WO | WO 2007/015419 A1 | 2/2007 |

* cited by examiner (a)

(b)

ELECTRODE FOR NONAQUEOUS ELECTROLYTE SECONDARY BATTERY, METHOD FOR PRODUCING SAME, AND NONAQUEOUS ELECTROLYTE SECONDARY BATTERY COMPRISING SUCH ELECTRODE FOR NONAQUEOUS ELECTROLYTE SECONDARY BATTERY

RELATED APPLICATIONS

This application is the U.S. National Phase under 35 U.S.C. §371 of International Application No. PCT/JP2007/052507, filed on Feb. 13, 2007, which in turn claims the benefit of Japanese Application No. 2006-036279, filed on Feb. 14, 2006, the disclosures of which Applications are incorporated by reference herein.

TECHNICAL FIELD

The present invention relates to an electrode for a non-aqueous electrolyte secondary battery and a method of producing the same, and a non-aqueous electrolyte secondary battery having an electrode for a non-aqueous electrolyte secondary battery.

BACKGROUND ART

In recent years, as mobile devices improve in performance and acquire more functions, secondary batteries serving as their power supplies are required to have higher and higher capacity. Lithium-ion secondary batteries are drawing attention as secondary batteries that can satisfy this need.

In order to achieve a high capacity in a lithium-ion secondary battery, use of silicon (Si), germanium (Ge), tin (Sn), or the like as an electrode active material has been proposed. An electrode for a lithium-ion secondary battery (which hereinafter may also be simply referred to as an "electrode") for which such an electrode active material is used is formed by applying on a current collector a slurry which contains an electrode active material, a binder, and the like, for example (called a "painted electrode").

However, such electrode active materials undergo large changes in volume when occluding or releasing lithium ions, thus resulting in the problem of being pulverized through expansions and contractions that accompany repetitive charge and discharge. As an electrode active material becomes fine matter by being pulverized, a deterioration in the charge collecting ability of the electrode will occur. This will also increase the area of contact between the electrode active material and the electrolytic solution, thus promoting a decomposition reaction of the electrolytic solution by the electrode active material. This makes it impossible to obtain sufficient charge-discharge cycle characteristics.

Patent Document 1 and Patent Document 2 disclose, instead of a conventional painted electrode, forming an electrode active material layer on a current collector by using vapor-phase technique, liquid-phase technique, sintering technique, or the like. With an electrode which has been formed in this manner, as compared to a conventional painted electrode, the electrode active material's tendency to become fine matter through pulverization can be suppressed, and the adhesion between the current collector and the electrode active material layer can be enhanced, whereby deterioration in charge collecting ability can be prevented. Thus, it is expected that improvements in electrode capacity and cycle life beyond conventional levels are expected. Furthermore, whereas a conventional painted electrode would include an electrically conductive material, a binder, voids, etc., the methods of forming electrode active material layers disclosed in Patent Documents 1 and 2 can reduce or eliminate their amounts within the electrode, which permits an essential enhancement of the capacity of the electrode.

However, even with the aforementioned electrode, expansions and contractions of the electrode active material due to charge and discharge may cause problems such as peeling of the electrode active material layer from the current collector, wrinkles occurring on the current collector, etc., thus making it difficult to obtain sufficient cycle characteristics.

In view of this, it has been proposed to form an intermediate layer between the current collector and the electrode active material layer, thereby improving the adhesion between the current collector and the electrode active material layer and preventing peeling of the electrode active material layer from the current collector. Patent Document 3 discloses a construction in which a current collector composed of a metal or alloy having a high mechanical strength is used and an intermediate layer that can be alloyed with the electrode active material, e.g., copper (Cu), is provided between the current collector and the electrode active material layer. Patent Document 4 discloses a construction in which an intermediate layer containing molybdenum (Mo) or tungsten (W) is provided between the current collector and the electrode active material layer. Patent Document 5 discloses a construction in which an intermediate layer containing nickel (Ni) and titanium (Ti) is provided.

Patent Document 6 discloses performing an oxidation treatment for the surface of the current collector, and forming on the resultant oxide film an electrode active material layer which contains at least one of Si and Ge.

On the other hand, Patent Document 7 takes note of the fact that, in the case where silicon oxide is used as an electrode active material, the expansion coefficient of the electrode active material associated with charge and discharge varies depending on the oxygen content in the silicon oxide, thus proposing to increase the oxygen concentration in the electrode active material layer near the current collector so as to be higher than the average oxygen concentration in the electrode active material layer. In accordance with the construction of Patent Document 7, the expansion of the electrode active material layer near the current collector is reduced, thus suppressing deformation of the electrode due to expansion/contraction of the electrode active material layer.

[Patent Document 1] Japanese Laid-Open Patent Publication No. 11-339777

[Patent Document 2] Japanese Laid-Open Patent Publication No. 11-135115

[Patent Document 3] Japanese Laid-Open Patent Publication No. 2002-083594

[Patent Document 4] Japanese Laid-Open Patent Publication No. 2002-373644

[Patent Document 5] Japanese Laid-Open Patent Publication No. 2005-141991

[Patent Document 6] Japanese Laid-Open Patent Publication No. 2003-217576

[Patent Document 7] Japanese Laid-Open Patent Publication No. 2006-107912

DISCLOSURE OF INVENTION

Problems to be Solved by the Invention

However, in any of the constructions disclosed in Patent Documents 3, 4, and 5, an intermediate layer is provided between the current collector substrate material (Cu) and the electrode active material (Si), the intermediate layer containing a material other than the materials of the current collector and the electrode active material. Therefore, differences in expansion coefficient between the current collector, the intermediate layer, and the electrode active material layer may cause peeling at the interfaces between them. In the construction disclosed in Patent Document 6, too, peeling may occur at the interface between the electrode active material layer and the current collector due to a difference in expansion coefficient between the electrode active material layer and the current collector. Thus, peeling of the electrode active material layer cannot be adequately suppressed with the constructions of Patent Documents 3 to 6, and it is difficult to effectively enhance the cycle characteristics.

Moreover, with the construction proposed in Patent Document 7, particularly in the case where there is a thick electrode active material layer containing silicon oxide (e.g., over 10 μm), the expansion amounts of silicon oxide due to charge and discharge will have very large absolute values. Therefore, just increasing the oxygen concentration in the electrode active material layer near the current collector cannot completely suppress electrode deformation.

The present invention has been made in view of the aforementioned problems, and an objective thereof is to alleviate the stress acting on a current collector due to expansions and contractions associated with charge and discharge of an electrode active material, thus improving the cycle characteristics of a non-aqueous electrolyte secondary battery.

Means for Solving the Problems

In order to solve the above problems, an electrode for a non-aqueous electrolyte secondary battery according to the present invention includes: a current collector; a first active material layer formed on the current collector; and a second active material layer provided on the first active material layer, the second active material layer including a plurality of active material particles, wherein the plurality of active material particles are mainly of a chemical composition represented as $SiO_x$ ($0 \leq x < 1.2$); the first active material layer is mainly of a chemical composition represented as $SiO_y$ ($1.0 \leq y < 2.0$, $y > x$); and an area in which the first active material layer is in contact with the plurality of active material particles is smaller than an area in which the current collector is in contact with the first active material layer.

In accordance with the electrode for a non-aqueous electrolyte secondary battery of the present invention, a first active material layer is formed between the active material particles and the current collector, the first active material layer having a higher oxygen concentration, i.e., a smaller coefficient of volumetric expansion, than that of the active material particles. Therefore, while maintaining the lithium occlusion ability of the active material particles, the stress acting on the current collector due to expansions and contractions of the active material particle can be alleviated.

Since the area in which the current collector is in contact with the first active material layer is made larger than the area in which the first active material layer is in contact with the plurality of active material particles, the adhesion between the active material particles and the current collector can be greatly improved over the case where only the active material particles are formed on the current collector. Moreover, even if the active material particles expand by occluding lithium ions, spaces for such expansions can be secured between the active material particles, whereby the stress between the active material particles can be alleviated.

Thus, deformation of the electrode as well as peeling of the first active material layer and the active material particles from the current collector surface through repetitive charge and discharge can be suppressed, whereby a non-aqueous electrolyte secondary battery having excellent charge-discharge cycle characteristics can be provided.

EFFECTS OF THE INVENTION

With the electrode for a non-aqueous electrolyte secondary battery according to the present invention, the stress acting on a current collector due to expansions and contractions of active material particles associated with charge and discharge can be alleviated, and electrode deformation due to concentration of stress on the current collector can be suppressed.

Therefore, by employing the electrode for a non-aqueous electrolyte secondary battery according to the present invention for an electrochemical device such as a non-aqueous electrolyte secondary battery (e.g., a lithium-ion secondary battery) or an electrochemical capacitor, the charge-discharge cycle characteristics of the electrochemical device can be improved.

DESCRIPTION OF THE REFERENCE NUMERALS

Figure 1:
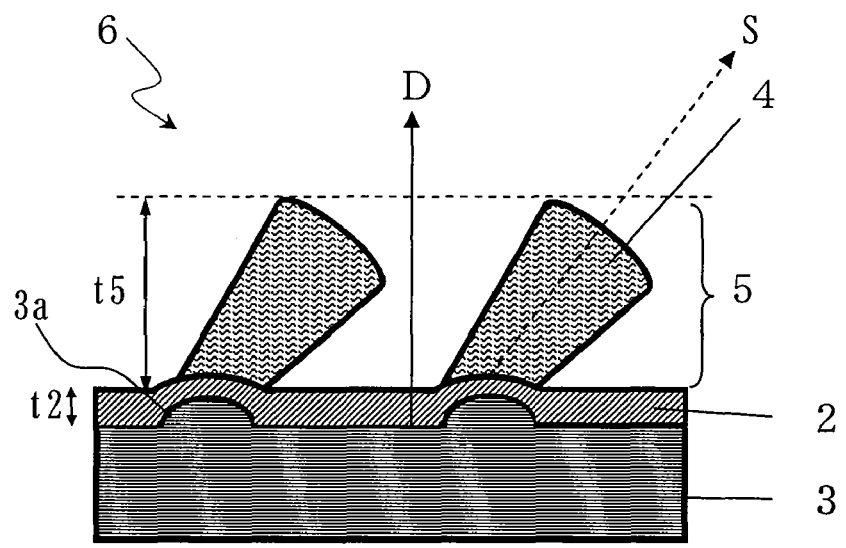
FIG. 1 A schematic cross-sectional view of an electrode according to an embodiment of the present invention.

2 first active material layer
3, 73 current collector
4, 74 active material particle
5 second active material layer
6 electrode
10 vacuum chamber
11 supply roll
12 take-up roll
13 pulley
14, 14A, 14B substrate cooling roll 15, 16 masking plate
17, 18 oxygen nozzle
19 film thickness monitor
20, 21 oxygen flow rate controller
22 Si raw material (evaporation source)
23 evaporation pot
24 electron beam radiation system
25 vacuum pump
26 first active material layer formation zone
27 active material particle-forming zone
30 current collector on which a first active material layer is formed
100, 200, 300 vacuum deposition apparatus

BEST MODE FOR CARRYING OUT THE INVENTION

First Embodiment

Hereinafter, with reference to the drawings, embodiments of the electrode for a lithium-ion secondary battery according to the present invention will be described.

First, FIG. 1 is referred to. FIG. 1 is a schematic cross-sectional view of an electrode for a lithium-ion secondary battery (hereinafter simply referred to as an "electrode") according to the present embodiment.

An electrode 6 includes a current collector 3, a first active material layer 2 formed on the surface of the current collector 3, and a second active material layer 5 provided on an upper face of the first active material layer 2. The second active material layer 5 is composed of a plurality of active material particles 4. The first active material layer 2 is formed so as to cover the surface of the current collector 3, and is mainly of a chemical composition represented as $SiO_y$ ($1.0 \leq y < 2.0$). The plurality of active material particles 4 are mainly of a chemical composition represented as $SiO_x$ ($0 \leq x < 1.2$, $y > x$). Moreover, the area in which the plurality of active material particles 4 are in contact with the first active material layer 2 is smaller than the area in which the current collector 3 is in contact with the first active material layer 2.

In the present embodiment, a rugged foil having a large surface roughness Ra (Ra: e.g. no less than 0.3 µm and no more than 5.0 µm) is used as the current collector 3. A plurality of bumps 3a are present on the surface of the current collector 3, such that each active material particle 4 is formed on a bump 3a via the first active material layer 2.

Note that FIG. 1 shows the electrode 6 during discharging, where the plurality of active material particles 4 are located on the surface of the current collector 3 with intervals therebetween. During charging, these active material particles 4 will expand so that the intervals between adjoining active material particles 4 are reduced, whereby the adjoining active material particles 4 may be partially in contact with each other.

In the present specification, the aforementioned x, y in the chemical compositions of the active material particles 4 and the first active material layer 2 represent average values of molar ratios of oxygen amounts, with respect to silicon amounts, in the active material particles 4 and the first active material layer 2, respectively (which hereinafter may also be simply referred to as "mole fractions of oxygen"). Note that the chemical compositions of the active material particles 4 and the first active material layer 2 are meant as compositions excluding any lithium that may have been added to or occluded by the active material particles 4 and the first active material layer 2. When saying that the active material particles 4 and the first active material layer 2 are mainly of the aforementioned chemical compositions, "mainly of" indicates that the active material particles 4 and the first active material layer 2 substantially have the aforementioned chemical compositions, and may contain impurities such as Fe, Al, Ca, Mn, Ti, and C.

In the aforementioned chemical composition, x and y are obtained by, calculating molar ratios of oxygen amounts with respect to Si amounts, based on an Si amount determined with an ICP Atomic Emission Spectrometer and an oxygen amount determined by combustion analysis technique, for example. They may alternatively be obtained by using fundamental parameter technique in an x-ray fluorescence spectrometry using the O-Kα line.

In the above construction, the first active material layer 2 having a higher oxygen concentration than that of the active material particles 4 is formed between the current collector 3 and the second active material layer 5 including the active material particles 4. Therefore, the stress acting on the surface of the current collector 3 due to expansion/contraction of the active material particles 4 can be alleviated. Hereinafter, with reference to the drawings, the reasons thereof will be described in detail.

Generally speaking, in an electrode active material ($SiO_z$, $0 \leq z < 2$) containing silicon, as its oxygen concentration becomes lower (i.e., the aforementioned z becomes smaller), the lithium ions have a higher occlusion ability and thus a higher charge-discharge capacity is obtained, but the coefficient of volumetric expansion due to charging increases. On the other hand, as the oxygen concentration in the electrode active material (i.e., the aforementioned z increases), the coefficient of volumetric expansion will be reduced but the charge-discharge capacity will become lower. To specifically describe such coefficients of volumetric expansion rates of the electrode active material, when the electrode active material is silicon ($z=0$), the electrode active material will undergo a volumetric expansion by about 400% due to charging. When the amount of oxygen atoms with respect to silicon atoms in the electrode active material is 30% ($z=0.3$), the electrode active material will undergo a volumetric expansion by about 350% due to charging. Similarly, when the amount of oxygen atoms is 60% ($z=0.6$), a volumetric expansion by about 280% occurs; and when the amount of oxygen atoms is 100% ($z=1.0$), a volumetric expansion by about 200% occurs.

Figure 2:
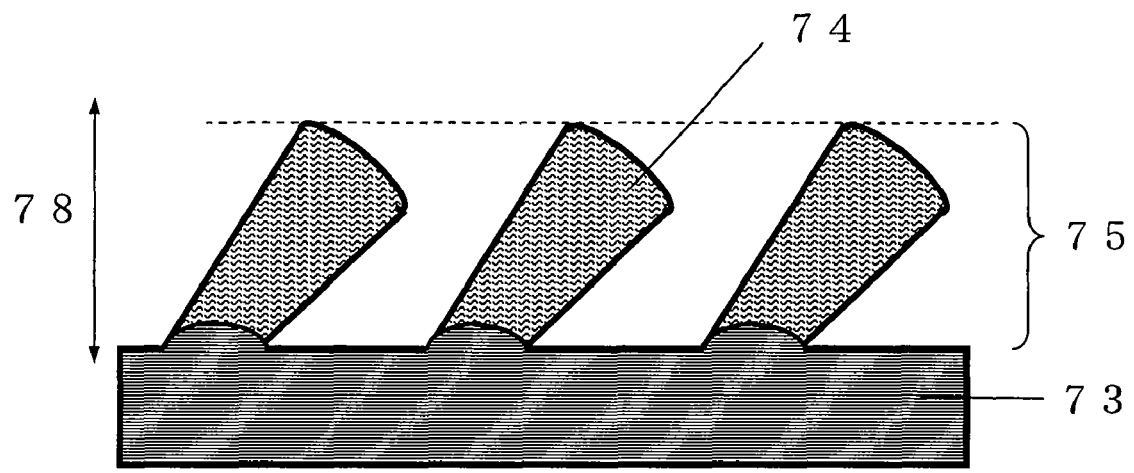
FIG. 2 A diagram for explaining effects of an embodiment of the present invention, being a schematic cross-sectional view showing a construction in which active material particles are formed directly on the current collector surface.

Now, a construction for forming a plurality of active material particles directly on the surface of the current collector by using an electrode active material ($SiO_z$, $0 \leq z < 2$) will be discussed. As shown in FIG. 2, in a construction where active material particles 74 are formed directly on the surface of the current collector 73, each active material particle 74 tries to isotropically expand upon charging. At this time, assuming that the plurality of active material particles 74 and the voids therebetween constitute a single film 75, each active material particle 74 is capable of isotropic expansion when the volume proportion occupied by the active material particles 74 in the film 75 (hereinafter referred to as "film density") is sufficiently low. However, since the coefficient of volumetric expansion of the active material particles 74 is very high as described earlier, as the film density increases, it becomes more difficult to secure spaces for the active material particles 74 to expand along in-plane directions of the film. As a result, the active material particles 74 cannot undergo isotropic expansion, but expands mainly along a film thickness direction 78. Therefore, with such a construction, depending on the composition (oxygen concentration) and film density of the electrode active material, the thickness of the active material particles 74, etc., the stress caused by expansion of the active material particles 74 may concentrate near the interfaces between the current collector 73 and the active material particles 74, thus possibly causing peeling of the active material particles 74 or plate electrode deformation near the current collector 73.

On the other hand, according to the present embodiment, as shown in FIG. 1, a first active material layer ($SiO_y$, y>x) 2 is provided between the current collector 3 and the active material particles ($SiO_x$) 4, the first active material layer 2 having a higher oxygen concentration (or molar ratio of the oxygen amount with respect to the silicon amount), i.e., a smaller coefficient of volumetric expansion, than that of the active material particles 4. As a result, while securing the occlusion ability of lithium ions of the active material particles 4, expansion of the active material particles 4 near the first active material layer 2 can be suppressed, whereby stress acting on the current collector 3 can be alleviated. Therefore, plate electrode deformation due to concentration of stress on the current collector 3 and peeling of the active material particles 4 and the first active material layer 2 can be suppressed. Thus, it is possible to enhance the charge-discharge cycle characteristics while ensuring a high charge-discharge capacity.

The first active material layer 2 according to the present embodiment is formed so as to cover the surface of the current collector 3, and its thickness t2 is generally uniform across the surface of the current collector 3. Such a first active material layer 2 can be obtained by vacuum deposition technique, for example. Note that the first active material layer 2 only needs to be formed between the current collector 3 and the active material particles 4 so as to prevent direct contact between the current collector 3 and the active material particles 4, and does not need to cover the entire surface of the current collector 3. As necessary, the first active material layer 2 may be partially removed in order to provide a lead for charge collection or the like, for example.

Next, the chemical compositions of the active material particles 4 and the first active material layer 2 according to the present embodiment will be discussed.

The value of x in the chemical composition ($SiO_x$) of the active material particles 4 is equal to or greater than 0 and less than 1.2. When x is 1.2 or more, it becomes necessary to form thicker active material particles 4 for securement of capacity, in which case formation of the active material particles 4 may cause problems such as warping of the current collector 3. Preferably, x is 0.7 or less, whereby a higher capacity can be obtained while reducing the thickness of the active material particles 4. On the other hand, x of 0.3 or more is preferable because volumetric expansion of the active material particles 4 is suppressed and the stress acting on the current collector 3 is further reduced.

The value of y in the chemical composition ($SiO_y$) of the first active material layer 2 is equal to or greater than 1.0 and less than 2.0. For, electrical conductivity of the first active material layer 2 can be ensured when y is less than 2.0, and the coefficient of volumetric expansion of the first active material layer 2 can be sufficiently lowered when y is 1.0 or more. Preferably, y is 1.6 or less, whereby the difference in expansion coefficient between the first active material layer 2 and the active material particles 4 can be reduced, so that the adhesion between the first active material layer 2 and the active material particles 4 can be further enhanced.

Therefore, by controlling x to no less than 0.3 and no more than 0.7 ($0.3 \leq x \leq 0.7$) and y to be no less than 1.0 and no more than 1.6 ($1.0 \leq y \leq 1.6$), cycle deteriorations can be made very small.

The oxygen concentration profiles of the first active material layer 2 and the active material particles 4 may be generally uniform along the thickness direction, or vary along the thickness direction. Even in the case where they vary along the thickness direction, it suffices if the average values of molar ratios (mole fractions of oxygen) of oxygen amounts with respect to silicon amounts in the first active material layer 2 and the active material particles 4 satisfy the aforementioned ranges of x and y, respectively. For example, the oxygen concentration in the first active material layer 2 may decrease away from the current collector 3 and toward the active material particles 4, whereby adhesion between the first active material layer 2 and the active material particles 4 can be further enhanced while alleviating concentration of stress on the current collector 3. Similarly, the oxygen concentration in each active material particle 4 may be higher near the first active material layer 2 and decrease toward the upper face. As a result, expansion of the portion of the active material particle 4 that is near the first active material layer 2 can be further decreased, so that deterioration in the cycle characteristics due to expansion of the active material particles 4 can be effectively suppressed.

Preferably, the oxygen concentrations in the first active material layer 2 and the active material particles 4 along the thickness direction decrease from the interior of the first active material layer 2 toward the interior of the active material particles 4. In other words, it is preferable that the chemical composition (mole fraction of oxygen) of an electrode active material which consists of the first active material layer 2 and the active material particles 4 gradually changes at the bonding site between the first active material layer 2 and each active material particle 4. With such a construction, no interface is created at the bonding site between the first active material layer 2 and each active material particle 4. Therefore, peeling of the active material particles 4 from the first active material layer 2 and pulverization of the active material particles 4 become less likely to occur, and the cycle characteristics can be further enhanced.

From the standpoint of electrical conductivity, energy density, expansion coefficient, and the like, it is preferable that the thickness t2 of the first active material layer 2 is greater than 2 nm and less than 100 nm. When the thickness t2 of the first active material layer 2 is greater than 2 nm, plate electrode deformation near the surface of the current collector 3 can be suppressed with an increased certainty. When the thickness t2 is less than 100 nm, and more preferably less than 50 nm, decrease in capacity due to the first active material layer 2 can be reduced, and a sufficient battery energy can be ensured.

The thickness t5 of the second active material layer 5 is equal to the thickness of the active material particles 4 in the present embodiment, and is preferably no less than 0.2 µm and no more than 50 µm from the standpoint of energy density, high-rate characteristics, productivity, etc., of the battery. When the thickness t5 of the second active material layer 5 is no less than 0.2 µm, and more preferably no less than 5 µm, a higher battery energy can be obtained. When the thickness t5 is no more than 50 µm, and more preferably no more than 30 µm, cracks occurring during formation of the second active material layer 5 can be reduced, whereby the reliability of the electrode 6 can be enhanced.

Note that the oxygen concentrations (mole fractions of oxygen) in the first active material layer 2 and the active material particles 4 along the thickness direction can be measured by various methods. For example, they can be determined by using fundamental parameter technique in X-ray Photoelectron Spectroscopy or Electron Spectroscopy for Chemical Analysis (XPS, ESCA) or in x-ray fluorescence spectrometry using the O-Kα line. Moreover, in order to measure the oxygen concentration in the first active material layer 2 along the thickness direction, Ar etching may be performed and the oxygen concentration at a desired thickness may be measured (e.g., a Marcus radio frequency glow discharge spectrometer manufactured by HORIBA), or, a silicon oxide coating for measurement purposes that has the intended thickness for measurement may be separately formed, and an oxygen concentration in its surface layer may be measured. Alternatively, a sample may be consolidated in resin, which is then polished to obtain a polished cross section, and the oxygen concentration and thickness in this polished cross section may be measured through EPMA analysis (Electron Probe Micro Analyzer) or wavelength dispersive x-ray microanalysis (Wavelength Dispersive X-ray Spectroscopy: WDS).

In the present embodiment, a ratio s1/s2 of an area (s1) in which the first active material layer 2 is in contact with the active material particles 4 to the area (s2) of the first active material layer 2 (hereinafter simply referred to as "coverage S") is preferably no less than 20% and no more than 70%. In the case where the active material particles 4 are formed in an oxygen atmosphere by using vacuum deposition technique, the coverage S can be controlled based on the surface roughness Ra of the current collector 3 and the incident angle of the silicon (Si) vapor with respect to the current collector 3. As the surface roughness Ra increases, shades are more likely to occur in response to the incoming particles to be deposited, thus resulting in a smaller coverage S. As the incident angle increases, shades become more likely to occur and the coverage S tends to become smaller. When the coverage S is 20% or more, a higher battery energy can be obtained without increasing the thickness t5 of the second active material layer 5. When the coverage S is 70% or less, sufficient spaces for expansion can be secured between the active material particles 4.

The coverage S can be measured by observing a polished cross section of the electrode 6 by using an SEM (Scanning Electron Microscope). In the present embodiment, the first active material layer 2 covers generally the entire surface of the current collector 3, and the surface of the first active material layer 2 has bumps/dents corresponding to the surface roughness Ra of the current collector 3; therefore, the coverage S is measured by the following method.

First, in a polished cross section under SEM observation, per length of 100 µm, a length A over the surface bumps/dents of the first active material layer 2 and a length B of portions of the surface bumps/dents of the first active material layer 2 that are bonded to the active material particles 4 are determined, and B/A is calculated. In this manner, B/A is calculated at four places in the polished cross section, and an average value thereof (i.e., an average value over a length of 400 µm) is defined as the coverage S. Note that, in the case where the surface of the first active material layer 2 has a shape corresponding to the surface configuration of the current collector 3, as in the present embodiment, the length over the surface bumps/dents of the current collector 3 may be adopted as the length A, instead of the length over the surface bumps/dents of the first active material layer 2, and the length of the portions of the surface bumps/dents of the current collector 3 that are bonded to the active material particles 4 may be adopted as the length B, for use in the determination of the coverage S.

The active material particles 4 in the present embodiment are not in contact with one another, but are independent. In this manner, spaces for accommodating the expansion of the active material particles 4 during lithium occlusion can be secured between the active material particles 4, with an increased certainty. Note that the construction of the active material particles 4 is not limited to the above. It suffices so long as the second active material layer 5 has sufficient voids between the active material particles 4 during discharging, and adjoining active material particles 4 may be partially in contact with one another.

Furthermore, in the present embodiment, the active material particles 4 have a growth direction S which is tilted with respect to the normal direction D of the surface of the current collector 3. By constructing a lithium-ion secondary battery with such an electrode, the area of portions of a positive-electrode active material layer that oppose the first active material layer 2 of the current collector 3 can be reduced. In other words, it is possible to increase the area of the portions of the positive-electrode active material layer that oppose the active material particles 4, which have a higher capacity than that of the first active material layer 2, whereby the charge-discharge efficiency can be enhanced.

Preferably, the angle between the growth direction S of the active material particles 4 and the normal direction D of the current collector 3 is 10° or more. When this angle is 10° or more, the area of the portions of the positive-electrode active material layer that oppose the active material particles 4 can be sufficiently increased, whereby the charge-discharge efficiency can be enhanced with an increased certainty. On the other hand, the aforementioned angle is less than 90°, but is preferably less than 80° since it becomes more difficult to form the active material particles 4 as it becomes closer to 90°.

Such active material particles 4 can be formed by, for example, allowing silicon and oxygen to be vapor-deposited on the surface of the current collector 3 from a direction which is tilted with respect to the normal direction of the current collector 3 (oblique vapor deposition). For example, by performing the aforementioned vapor deposition from an angle (tilting angle) of no less than 60° and no more than 75° with respect to the normal direction of the current collector 3, the active material particles 4 can be grown in a direction (growth direction) which is no less than 30° and no more than 50° with respect to the normal direction of the current collector 3.

There are no particular limitations as to the current collector 3 in the present embodiment, but a metal foil such as copper or nickel can be used, for example. The thickness of the foil is preferably 30 µm or less, and more preferably 10 µm. As a result, strength of the electrode 6 and volumetric efficiency of the battery can be ensured. On the other hand, from the standpoint of handling ease, the foil thickness is preferably 4 µm or more, and more preferably 5 µm or more.

The surface of the current collector 3 may be smooth, but for an enhanced adhesion strength between the surface of the current collector 3 and the first active material layer 2, it is preferable to use a foil having a large surface roughness (rugged foil). Moreover, by using as the current collector 3 a rugged foil with a large surface roughness, bumps/dents corresponding to the surface of the current collector 3 are also formed on the surface of the first active material layer 2. As a result, through the aforementioned oblique vapor deposition, the active material particles 4 can be grown with a higher priority on the bumps of the first active material layer 2, which can advantageously ensure intervals between adjoining active material particles 4.

The surface roughness Ra of the current collector 3 is preferably 0.3 µm or more. As used herein, the "surface roughness Ra" refers to "arithmetic mean roughness Ra" as defined under the Japanese Industrial Standards (JISB 0601-1994), and can be measured by using a surface roughness measurement system or the like, for example. When the surface roughness Ra is 0.3 µm or more, sufficient voids can be formed between adjoining active material particles 4 with an increased certainty. On the other hand, if the surface roughness Ra is too large, the current collector 3 will become thick, and therefore the surface roughness Ra is preferably 5.0 μm or less. Furthermore, when the surface roughness Ra of the current collector 3 is within the aforementioned range (no less than 0.3 μm and no more than 5.0 μm), sufficient adhesion force between the current collector 3 and the first active material layer 2 can be ensured, whereby peeling of the first active material layer 2 can be prevented.

The current collector 3 according to the present embodiment may be structured so that a regular pattern of bumps/dents is formed on the surface of the metal foil as described above. For example, grooves may be formed on the surface of the current collector 3 to partition the surface of the current collector 3 into a plurality of growth regions for growing active material particles 4. Preferably, the growth regions are placed in a regular arrangement. With this structure, it is possible to control the regions of the surface of the current collector 3 in which to grow the active material particles 4, whereby spaces for the active material particles 4 to expand can be secured in the intervals between adjoining active material particles 4 with an increased certainty.

Figure 3:
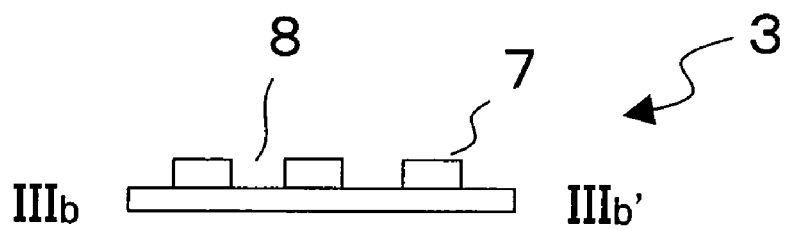
FIGS. 3 (*a*) and (*b*) are a cross-sectional view and a plan view, respectively, illustrating another current collector construction according to the present invention.
Figure 3:
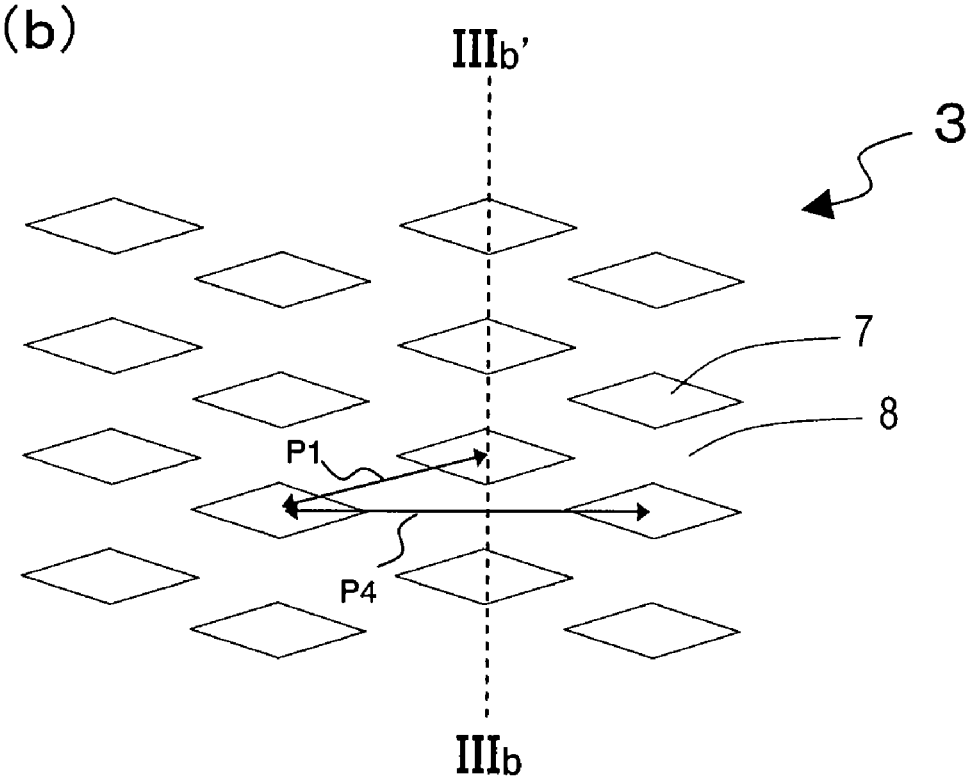

FIGS. 3(*a*) and (*b*) are a cross-sectional view and a plan view, respectively, showing an exemplary current collector 3 having grooves formed on its surface. In the illustrated example, the surface of the current collector 3 has a plurality of growth regions 7 partitioned by rectangular grooves 8. The depth of the grooves 8 is 10 μm, for example. Each growth region 7 has a diamond shape as viewed from the normal direction of the surface of the current collector 3 (length of the diagonal: 10 μm×30 μm), and are placed in a regular arrangement so that the shortest distance P1 between the centers of adjoining growth regions 7 is 30 μm. The arraying pitch P2 along the longer diagonal of the diamond shape is 60 μm. The surface of the growth region 7 may be flat, but preferably includes bumps/dents and has a surface roughness Ra of no less than 0.3 μm and no more than 5.0 μm, similarly to the surface roughness of the current collector 3 shown in FIG. 1.

The current collector 3 as shown in FIG. 3 may be formed by providing a predetermined pattern of grooves 8 on the surface of a metal foil (Cu foil) by using cutting technique, for example. Alternatively, a plurality of elevations may be formed on the surface of a metal foil by plating technique or transfer technique, and upper faces thereof may be utilized as growth regions 7.

When such a regular pattern of bumps/dents is formed on the surface of the current collector 3, the surface of the first active material layer 2 will also have a corresponding pattern. When active material particles 4 are formed on such a first active material layer 2 by oblique vacuum deposition technique, the active material particles 4 will grow in the respective growth regions 7 via the first active material layer 2. Therefore, by appropriately selecting the pattern, size, arraying pitch, etc., of the growth regions 7 and grooves 8, it becomes possible to effectively control the intervals between the active material particles 4 and the film density.

The active material particles 4 in the present embodiment are not limited to columnar particles which are tilted in one direction as shown in FIG. 1. For example, the active material particles 4 may grow along the normal direction D of the surface of the current collector 3. Such active material particles 4 can be obtained in the following manner. First, a photoresist is applied onto the current collector 3 having the first active material layer 2 formed thereon, and thereafter a masking exposure treatment or the like is performed. Next, the non-exposed portions are removed by being dissolved through an etching treatment, whereby a resist having a pattern that corresponds to the voids between active material particles 4 is formed on the current collector 3 having the first active material layer 2 formed thereon. Then, in the portions of the surface of the current collector 3 (having the first active material layer 2 formed thereon) that are not covered with the resist, an active material is deposited by electroplating technique, vacuum deposition technique, or the like, thus obtaining active material particles 4. Thereafter, the resist is removed.

Figure 4:
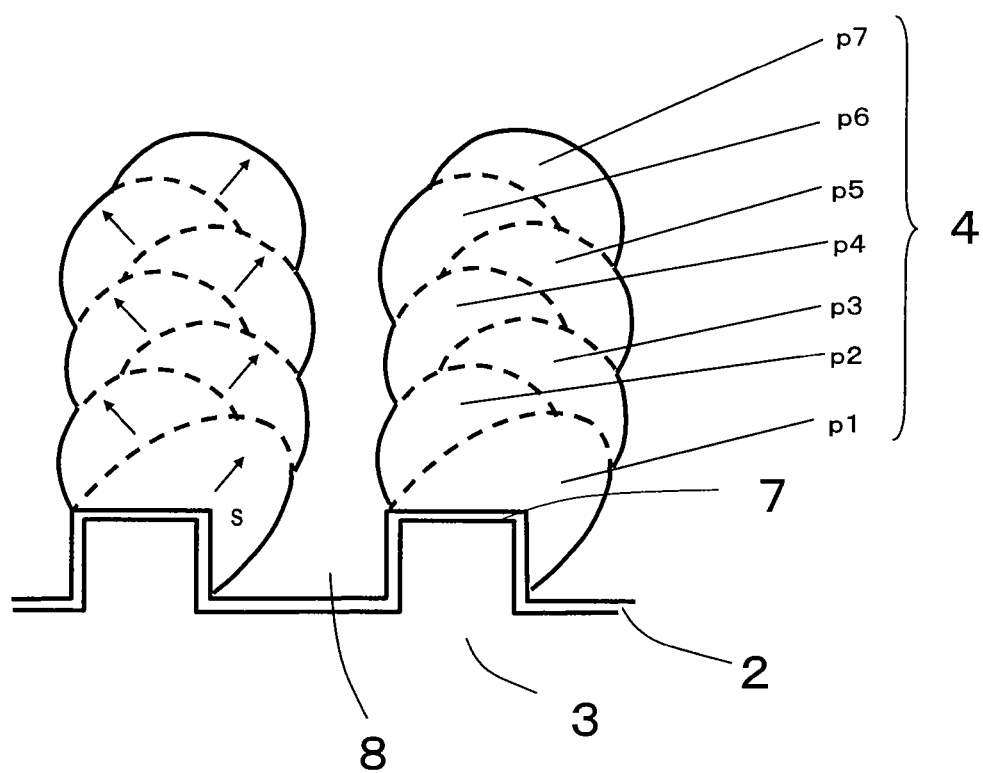
FIG. 4 A schematic cross-sectional view illustrating another electrode construction according to the present invention.

Moreover, each active material particle 4 may have a plurality of portions with different growth directions S. FIG. 4 is a schematic cross-sectional view illustrating active material particles 4 each having a plurality of portions with different growth directions S. In this example, a current collector 3 having the structure which has been described with reference to FIG. 3 is used. In other words, the surface of the current collector 3 is partitioned into a plurality of growth regions 7 by grooves 8. The active material particles 4 are formed in the respective growth regions 7 of the current collector 3, and each have seven portions p1 to p7 with different growth directions S. Such active material particles 4 can be obtained by performing a plurality of steps of vapor deposition while changing the tilting angle. Such a structure can be confirmed by performing a chemical etching for a polished cross section which is perpendicular to the surface of the current collector 3 of the electrode 6, and observing the sample obtained.

Note that the second active material layer 5 only needs to contain active material particles 4, and may also contain active material layers or bodies of active material other than the active material particles. For example, in FIG. 1 and FIG. 4, layers having the same chemical composition as that of the active material particles 4 may be provided on portions of the surface of the first active material layer 2 that are not in contact with the active material particles 4. However, in view of deformation of the electrodes 6 due to expansions and contractions of the active material in the portions where such layers are provided, it is preferable that those layers have a thickness of 0.5 μm or less.

Hereinafter, with reference to the drawings, a method of producing the electrode according to the present embodiment will be described, by taking as an example a method of producing the electrode 6 shown in FIG. 1.

First, the first active material layer 2 is formed on the current collector 3. Formation of the first active material layer 2 can be performed by, using the vapor deposition apparatus as shown in FIG. 5, supplying silicon and oxygen onto the surface of the current collector 3, and vapor-depositing a silicon oxide that has the desired chemical composition.

Figure 5:
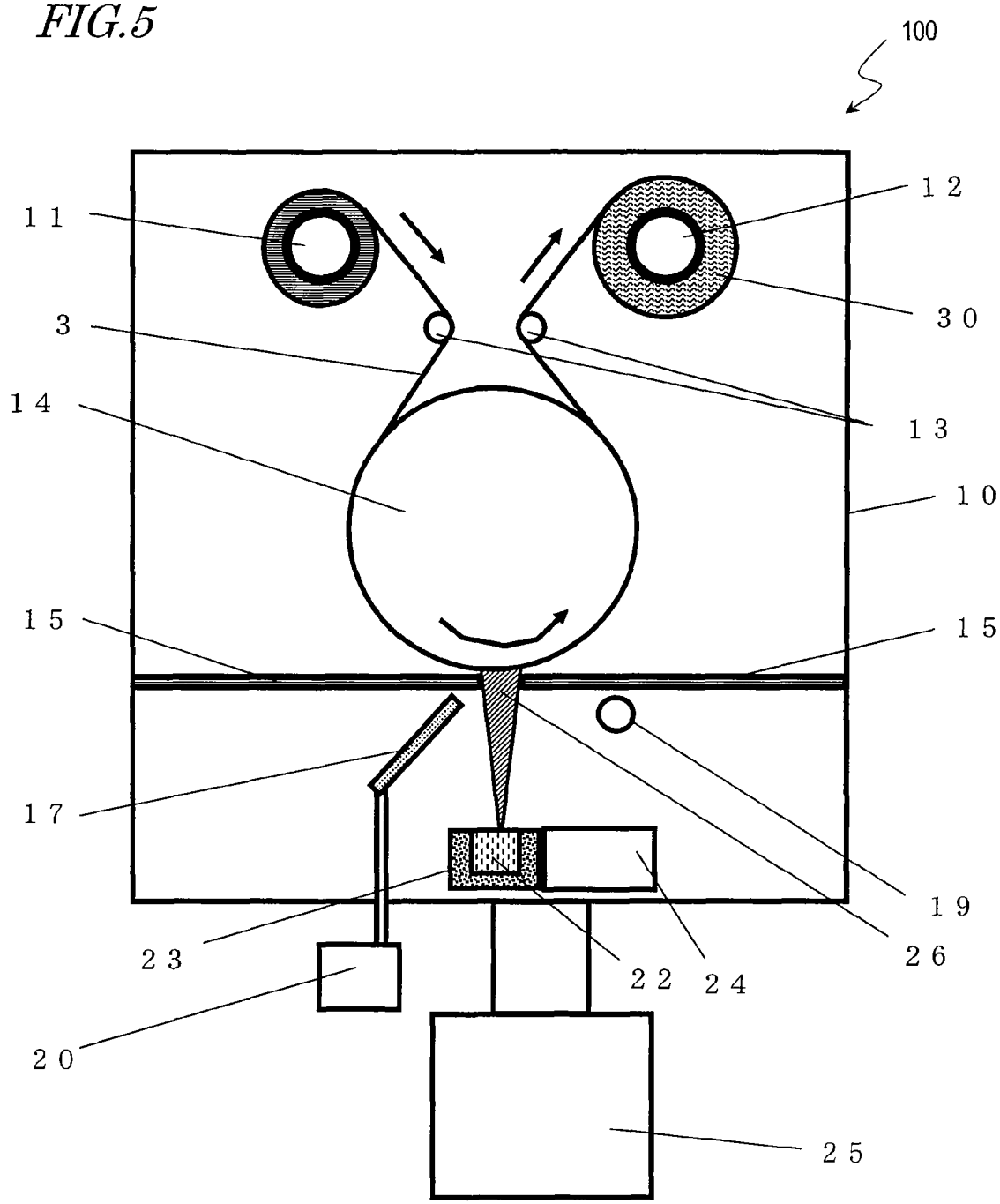
FIG. 5 A schematic diagram for explaining an exemplary method of producing an electrode according to a first embodiment of the present invention.

The vapor deposition apparatus 100 shown in FIG. 5 includes a vacuum chamber 10 and an vacuum pump 25 for evacuating the vacuum chamber. Insider the vacuum chamber 10 are comprised: a supply roll 11 for retaining the current collector 3 before being subjected to vapor deposition; a take-up roll 12 for retaining the current collector 30 after the first active material layer 2 has been formed; a substrate cooling roll 14 placed between the rolls 11 and 12; an oxygen nozzle 17 for emitting an oxygen gas; a Si raw material 22 as an evaporation source for supplying silicon; an evaporation pot 23 for retaining the Si raw material 22; and an electron beam radiation system 24 for evaporating the Si raw material 22. Via tubing, the nozzle 17 is connected to an oxygen flow rate controller 20 and an oxygen cylinder (not shown). A masking plate 15 is also provided inside the vacuum chamber 10 so that, through a gap in the masking plate 15 and from a generally normal direction of the current collector 3, the oxygen emitted from the oxygen nozzle 17 and the Si atoms evaporated from the Si raw material 22 are supplied onto the surface of the current collector 3 on the substrate cooling roll 14. A region 26 defined by the gap in the masking plate 15, in which oxygen and Si atoms are supplied onto the surface of the current collector 3, is referred to as a "first active material layer formation zone".

A method for forming the first active material layer 2 by using the vapor deposition apparatus 100 as such will be specifically described below.

A foil-like current collector 3 is placed on the supply roll 11, and while evacuating the vacuum chamber 10 with the vacuum pump 25, the foil-like current collector 3 is moved from the supply roll 11 via pulleys 13 and allowed to travel along the substrate cooling roll 14. In the meantime, the evaporation pot 23 containing the Si raw material 22 is irradiated with electrons from the electron beam radiation system 24, whereby Si is melted and evaporated. The evaporation amount of Si is controlled by using a film thickness monitor 19. At the same time, oxygen is introduced from the oxygen nozzle 17 into the vacuum chamber 10. The flow rate of oxygen is controlled by the oxygen flow rate controller 20. Si and oxygen pass through the gap in the masking plate 15, and, at the first active material layer formation zone 26, are supplied onto the surface of the current collector 3 which is traveling on the substrate cooling roll 14. In the first active material layer formation zone 26, Si atoms are incident to and deposited on the traveling current collector 3 in a generally normal direction, whereby the first active material layer 2 is formed. The current collector 30 having the first active material layer 2 formed thereon (which hereinafter may also be simply referred to as the current collector 30) is wound up by the take-up roll 12.

Figure 6:
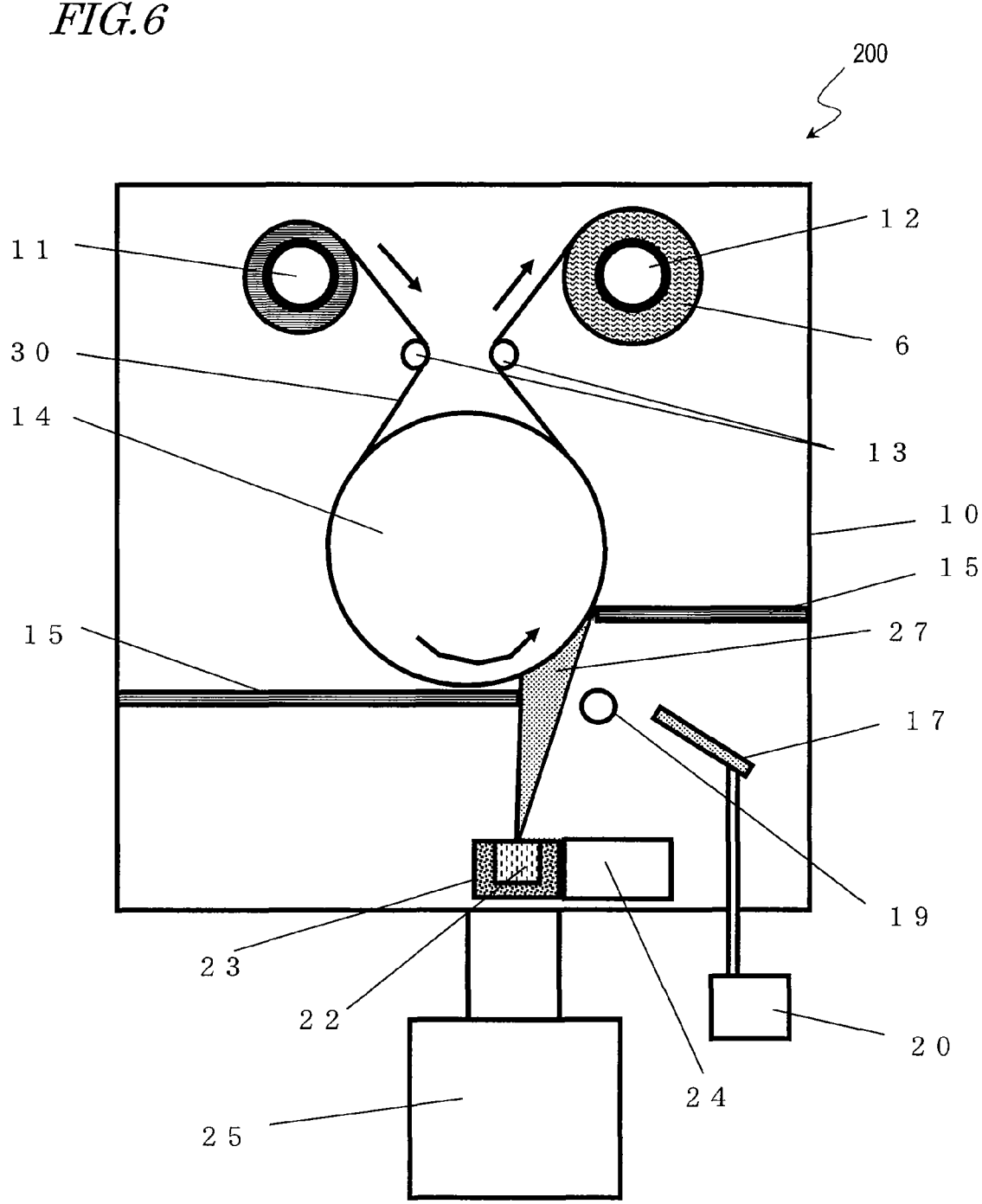
FIG. 6 A schematic diagram for explaining an exemplary method of producing an electrode according to a first embodiment of the present invention.

Next, on the surface of the current collector 30 having the first active material layer 2 formed thereon, the second active material layer 5 composed of a plurality of active material particles 4 is formed. Thus, the electrode 6 is obtained. Formation of the active material particles 4 can be performed by, using a vapor deposition apparatus 200 as shown in FIG. 6, supplying silicon and oxygen onto the surface of the current collector 30, and vapor-depositing a silicon oxide having the desired chemical composition. When performing such a vapor deposition, it is desirable that the surface of the current collector 3 before forming the first active material layer 2 is roughened.

The vapor deposition apparatus 200 shown in FIG. 6 differs from the vapor deposition apparatus 100 shown in FIG. 5 in that the substrate cooling roll 14, the Si raw material 22, the masking plate 15, the oxygen nozzle 17, and the like are placed in such a manner that oxygen and Si atoms are supplied onto the surface of the current collector 30 from a direction which is tilted with respect to the normal direction of the current collector 30. For simplicity, constituent elements which are similar to those of the vapor deposition apparatus 100 shown in FIG. 5 are denoted by like reference numerals, and descriptions thereof are omitted.

Note that, in the vapor deposition apparatus 200, a region 27 which is defined by a gap in the masking plate 15, in which oxygen and Si atoms are supplied onto the current collector 30 from a direction that is tilted with respect to the normal direction of the current collector 30, is referred to as an "active material particle-forming zone".

A method for forming the second active material layer 5 by using the vapor deposition apparatus 200 as such will be specifically described below.

The current collector 30 is placed on the supply roll 11, and while evacuating the vacuum chamber 10 with the vacuum pump 25, the current collector 30 is moved from the supply roll 11 via the pulleys 13 and allowed to travel along the substrate cooling roll 14. In the meantime, Si raw material is melted and evaporated from the evaporation pot 23 containing the Si raw material 22. At the same time, oxygen is introduced from the oxygen nozzle 17 into the vacuum chamber 10. The flow rate of oxygen is controlled by the oxygen flow rate controller 20. Si vapor and oxygen pass through the gap in the masking plate 15, and, at the active material particle-forming zone 27, are supplied onto the surface of the current collector 3 which is traveling on the substrate cooling roll 14. In the active material particle-forming zone 27, Si atoms are incident to and deposited on the traveling current collector 30 from a direction which constitutes an angle $\theta$ ($0°<\theta<90°$) with respect to the normal direction thereof. As a result, a plurality of active material particles 4 grow in a direction which is tilted with respect to the normal direction of the current collector 3, and the second active material layer 5 composed of these active material particles 4 is formed. Thereafter, the current collector having the second active material layer 5 formed thereon is wound up by the take-up roll 12. Thus, the electrode 6 is obtained.

Note that, by only supplying Si vapor onto the surface of the current collector 3, active material particles 4 which are substantially composed of Si alone ($x=0$ in $SiO_x$) may be formed. In this case, supply of oxygen from the oxygen nozzle 17 can be stopped by using the oxygen flow rate controller 20.

The thickness and composition (oxygen concentration) of the first active material layer 2 obtained by the aforementioned method can be controlled based on, respectively, the time required for the current collector 3 to pass through the first active material layer formation zone 26 and the oxygen flow rate from the oxygen nozzle 17. Similarly, the thickness and composition (oxygen concentration) of the active material particles 4 can be controlled based on, respectively, the time required for the current collector 30 to pass through the active material particle-forming zone 27 and the oxygen flow rate from the oxygen nozzle 17. Since the substrate cooling roll 14 shown in FIG. 5 and FIG. 6 has a constant rotation speed, the deposition rate of Si atoms at the first active material layer formation zone 26 and the active material particle-forming zone 27 can be calculated from the generally known cos-rule. Moreover, based on the position of the masking plate 15, the time required for the current collector 3, 30 to pass through the first active material layer formation zone 26 or the active material particle-forming zone 27 can be set as appropriate.

As the evaporation pot 23, a carbon pot (which is commonly used for melting Si) is used. The silicon purity of the Si raw material 22 should be as high as possible, and is 99.99% or more, for example. The method for heating the Si raw material 22 may be an induction heating technique, a resistance heating technique, a heating technique based on electron beam irradiation, or the like.

The oxygen amount in the first active material layer formation zone 26 and in the active material particle-forming zone 27 can be appropriately selected depending on manufacturing conditions such as: the amount of oxygen to be introduced from the oxygen nozzle 17, the shape of the vacuum chamber 10, the evacuation ability of the vacuum pump 25, the evaporation rate of the Si raw material 22, and the width of the first active material layer formation zone 26 and the active material particle-forming zone 27 along the travel direction of the current collector 3, 30.

Methods for forming the first active material layer 2 and the second active material layer 5 are not particularly limited to the above methods, but it is preferable to use a dry process such as a vapor deposition technique, a sputtering technique, or a CVD technique. In particular, a vapor deposition technique is a method which provides excellent productivity. Use of a vapor technique is advantageous because it allows the first active material layer 2 and second active material layer 5 to be formed on the moving current collector 3 in a continuous manner and in large quantity.

In the methods described above with reference to FIG. 5 and FIG. 6, the current collector 30 after having formed the first active material layer 2 is temporarily wound up, and thereafter is again attached to the vapor deposition apparatus for forming the second active material layer 5. However, formation of the first active material layer 2 and the second active material layer 5 may be carried out within the same vacuum chamber. For example, two substrate cooling rolls may be provided in the vacuum chamber, and after the first active material layer 2 is formed on the surface of the current collector 3 upon one substrate cooling roll, the second active material layer 5 may be formed upon the other substrate cooling roll, without winding up the current collector 3. Alternatively, the first active material layer 2 and the second active material layer 5 may be successively formed on the same substrate cooling roll.

In the case where the first active material layer 2 and the second active material layer 5 are to be formed in the same vacuum chamber, the first active material layer formation zone 26 for forming the first active material layer 2 and the active material particle-forming zone 27 for forming the active material particles 4 may be placed in close proximity, and the active material particles 4 may be grown immediately after formation of the first active material layer 2, whereby an electrode 6 whose oxygen concentration gradually changes at the bonding sites between the first active material layer 2 and the active material particles 4 can be easily produced. Moreover, forming the first active material layer 2 and the active material particles 4 (i.e., the second active material layer 5) by using the same evaporation source (e.g., Si raw material) can advantageously simplify the production equipment.

In the methods described above with reference to FIG. 5 and FIG. 6, the first active material layer 2 and the second active material layer 5 are formed for the traveling current collector 3, 30 upon the roller (substrate cooling roll) 14. However, an endless belt may be used instead of a roller, and the first active material layer 2 and the second active material layer 5 may be formed for the current collector 3, 30 which is traveling upon a linearly-extending portion of the endless belt. Alternatively, the first active material layer 2 and the second active material layer 5 may be formed while fixing the current collector 3, 30 within the vacuum chamber.

Next, with reference to the drawings, an exemplary construction of a lithium-ion secondary battery which is obtained by applying the electrode 6 of the present embodiment will be described.

Figure 7:
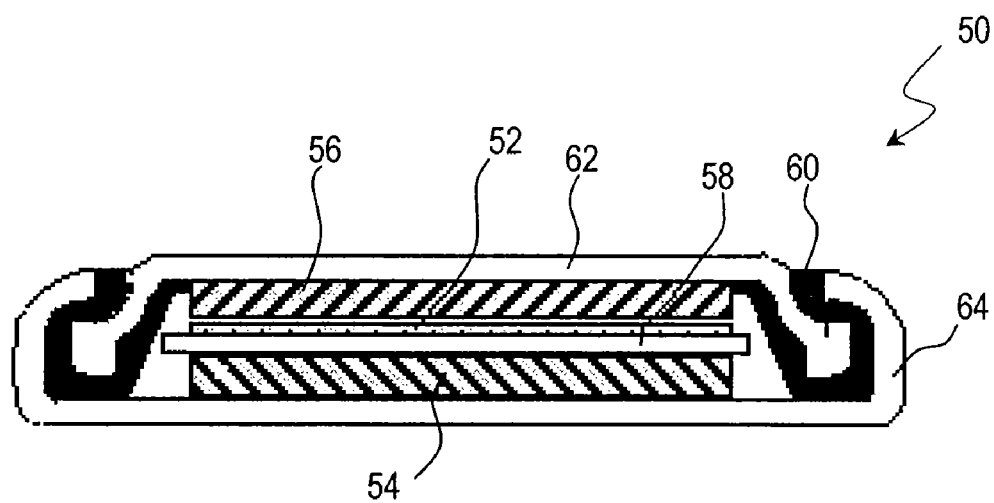
FIG. 7 A schematic cross-sectional view illustrating a construction of a lithium-ion secondary battery according to the present invention.

FIG. 7 is a schematic cross-sectional view illustrating a coin-type lithium-ion secondary battery in which the electrode of the present embodiment is used. The lithium-ion secondary battery 50 includes an electrode 52, a positive electrode 54 containing a positive-electrode active material such as $LiCoO_2$, $LiNiO_2$, or $LiMn_2O_4$, and a separator 58 provided between the electrode 52 and the positive electrode 54 and being composed of a microporous film or the like. Together with an electrolyte having lithium-ion conductivity, the electrode 52, the positive electrode 54, and the separator 58 are accommodated within the case 64 by a sealing plate 62 having a gasket 60. A stainless steel spacer 56 for filling up the space (shortage of intra-case height) in the case 64 is also placed inside the case 64.

The surface of the electrode 52 facing the positive electrode 54 has the construction described above with reference to FIG. 1. Moreover, as an electrolyte having lithium-ion conductivity, an electrolyte of a generally known composition, e.g., an electrolyte obtained by dissolving lithium hexafluorophosphate or the like in a cyclic carbonate such as ethylene carbonate or propylene carbonate may be used, for example.

Note that the construction of a lithium-ion secondary battery having the electrode 6 of the present embodiment is not limited to the construction shown in FIG. 7. Other than a coin-type lithium-ion secondary battery, the electrode 6 of the present embodiment is also applicable to lithium-ion secondary batteries of various shapes, e.g., cylindrical, flat, or prismatic. Moreover, the manner of sealing the lithium-ion secondary battery and the materials of the respective elements composing the battery are not particularly limited either. Furthermore, it is also applicable to a non-aqueous electrolyte secondary battery other than a lithium-ion secondary battery.

Second Embodiment

Hereinafter, a method of producing an electrode according to a second embodiment of the present invention will be described. The method of the present embodiment differs from the methods which have been described with reference to FIG. 5 and FIG. 6 in that the first active material layer 2 and the second active material layer 5 are successively formed by using the same evaporation source, within the same vacuum chamber.

Figure 8:
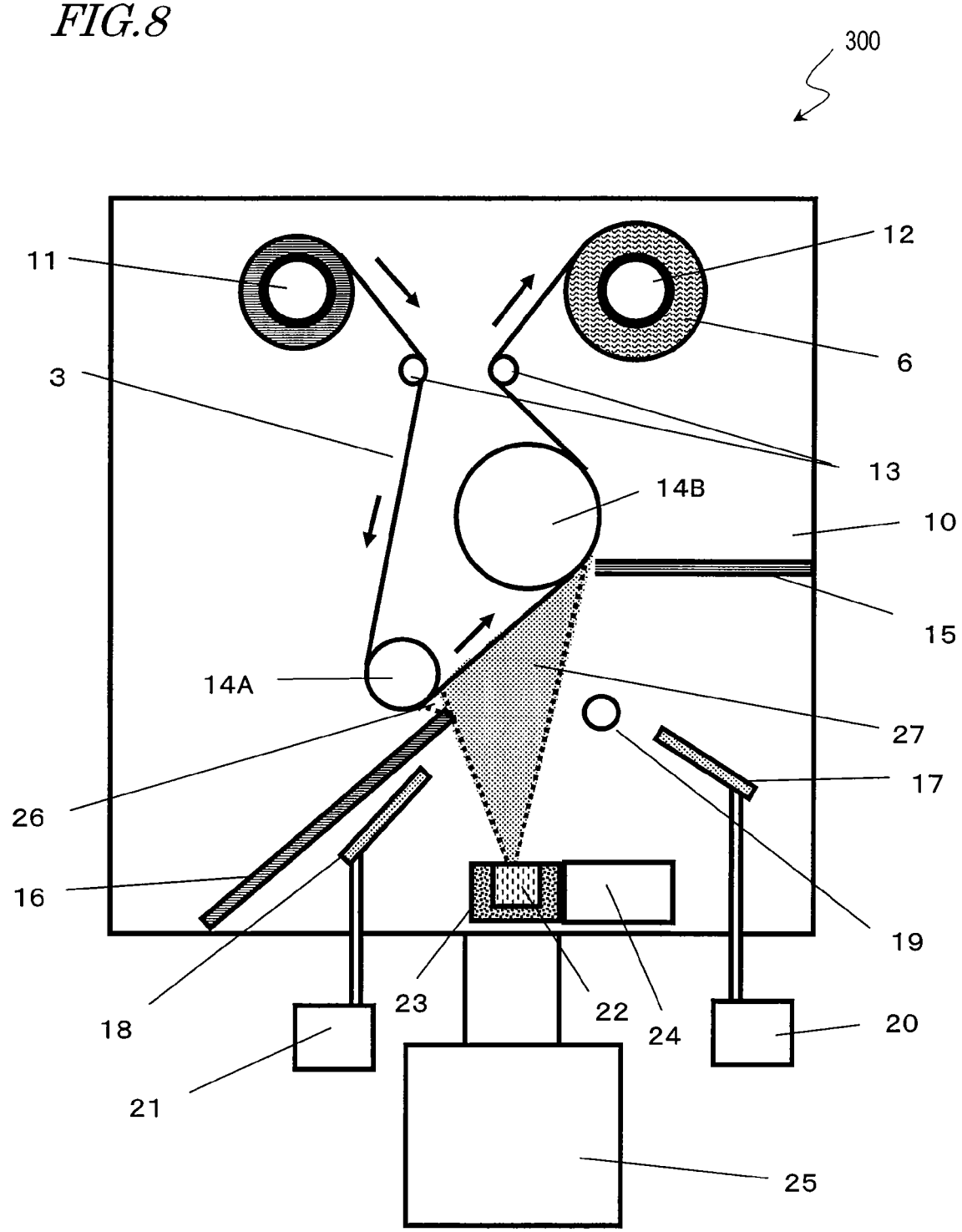
FIG. 8 A schematic diagram for explaining an exemplary method of producing an electrode according to a second embodiment of the present invention.

FIG. 8 is a diagram for explaining the production method according to the present embodiment. For simplicity, FIG. 8, constituent elements which are similar to those of the vapor deposition apparatus 100 and 200 shown in FIG. 6 are denoted by like reference numerals, and descriptions thereof are omitted.

In the present embodiment, a vacuum deposition apparatus 300 shown in FIG. 8 is used to form the second active material layer 5, which is composed of the first active material layer 2 and the active material particles 4, on the surface of the foil-like current collector 3.

In the vapor deposition apparatus 300 shown in FIG. 8, upper and lower substrate cooling rolls 14A and 14B, a Si raw material 22, an upper masking plate 15, a lower masking plate 16, first and second oxygen nozzles 17 and 18, and the like are placed so as to create: an active material particle-forming zone 27, in which oxygen and Si atoms are supplied to the current collector 3 from a direction that is tilted with respect to the normal direction of the current collector 3; and a first active material layer formation zone 26, which is provided immediately before the active material particle-forming zone 27 and in which the oxygen concentration is increased than in the active material particle-forming zone 27.

A method for forming the first active material layer 2 and the second active material layer 5 by using the vapor deposition apparatus 300 as such will be specifically described.

The foil-like current collector 3 is placed on the supply roll 11, and while evacuating the vacuum chamber 10 with an vacuum pump 25, the current collector 3 is moved from the supply roll 11 via the pulleys 13, and allowed to travel along the lower and upper substrate cooling rolls 14A and 14B. In the meantime, an evaporation pot 23 containing the Si raw material 22 is irradiated with electrons from an electron beam radiation system 24, whereby the Si raw material is melted and evaporated. The evaporation amount of Si is controlled by a film thickness monitor 19. At the same time, oxygen is introduced into the vacuum chamber 10 from the first oxygen nozzle 17 and the second oxygen nozzle 18. The amounts of oxygen emitted from the nozzles 17 and 18 are controlled by a first oxygen flow rate controller 20 and a second oxygen flow rate controller 21, respectively. As shown in the figure, within the emission range of Si atoms, a region that is defined by a gap between the upper masking plate 15 and the lower masking plate 16 serves as the "active material particle-forming zone" 27. On the other hand, a region that lies outside of the emission range of the Si atoms but is located between the lower masking plate 16 and the lower substrate cooling roll 14A, in which Si atoms are indirectly supplied to the current collector 3 through collision with gaseous molecules, etc., serves as the "first active material layer formation zone" 26.

The current collector 3 traveling from the supply roll 11 first passes through the first active material layer formation zone 26. Here, at the surface of the current collector 3, the Si atoms which are indirectly supplied through collision with gaseous molecules or the like react with the oxygen which is supplied from the first oxygen nozzle 17 and the second oxygen nozzle 18 and which has arrived in between the lower masking plate 16 and the lower substrate cooling roll 14, whereby the first active material layer 2 is formed. Therefore, unlike in the active material particle-forming zone 27, there is no directionality as to the positions at which Si atoms are vapor-deposited, and no shadowing effect as described later occurs. As a result, the first active material layer 2 is generally uniformly formed across the entire surface of the current collector 3. The vapor deposition rate of the Si atoms is controlled by adjusting the distance (interspace) between the lower masking plate 16 and the current collector 3. The thickness of the first active material layer 2 is determined by the evaporation rate of Si, the distance between the melting surface of the evaporation material and the lower masking plate 16, the interspace between the lower masking plate 16 and the current collector 3, the transportation speed of the current collector 3, and the like. For example, assuming that the Si evaporation rate from the evaporation pot 23 is 0.04 g/sec, the vertical distance from the Si melting surface in the evaporation pot 23 to the lower masking plate 16 is 435 mm, the interspace between the lower masking plate 16 and the current collector 3 is 3 mm, and the transportation speed of the current collector 3 is 0.4 cm/min, the first active material layer 2 has a thickness of about 50 nm.

After the first active material layer 2 is formed, the current collector 3 moves to the active material particle-forming zone 27. In the active material particle-forming zone 27, Si vapor and oxygen are supplied onto the surface of the current collector 3, whereby the second active material layer 5 composed of a plurality of active material particles 4 is obtained on the first active material layer 2. Here, Si atoms are incident on the traveling current collector 3 from a direction which is at an angle θ (0°<θ<90°) with respect to the normal direction of the current collector 3, so that the active material particles 4 grow in a direction which is tilted from the normal direction of the current collector 3. Since the Si atoms are incident to the surface of the current collector 3 from the specific direction, they are likely to be vapor-deposited upon the bumps (bumps 3a shown in FIG. 1) on the surface of the current collector 3, thus resulting in the silicon oxide growing in columnar shapes only on the bumps. On the other hand, in any portion of the surface of the current collector 3 that is shaded by a columnar growth of silicon oxide, the Si atoms are not incident and no silicon oxide is vapor-deposited (shadowing effect).

Thereafter, the current collector having the second active material layer 5 formed thereon is wound up by the take-up roll 12. Thus, the electrode 6 is obtained.

With the above-described method, the active material particle-forming zone 27 and the first active material layer for-mation zone having a higher oxygen concentration than in the active material particle-forming zone 27 can be placed in close proximity, within the same vacuum chamber. This makes it possible to successively form the first active material layer 2 and the second active material layer 5 by using the same evaporation source (Si raw material) 22. Therefore, the number of production steps can be reduced, and the production equipment can be simplified. Moreover, with the above-described method, while allowing the current collector 3 to travel, the step of forming the first active material layer 2 and the step of forming the second active material layer 5 are simultaneously performed, whereby the time required for manufacture can also be reduced.

EXAMPLES

Examples of the electrode for a lithium-ion secondary battery according to the present invention will be described. Herein, electrodes of Examples 1 and 2 were produced by using the methods described in Embodiments 1 and 2, respectively. For comparison, an electrode lacking the active material layer was produced as Comparative Example.

Example 1

With the methods described above with reference to FIG. 5 and FIG. 6, an electrode for a lithium-ion secondary battery of Example 1 was produced. The specific production method will be described.

First, by using the vapor deposition apparatus 100 shown in FIG. 5, the first active material layer 2 was formed on the surface of the current collector 3. A Cu foil (thickness: 40 μm) having a surface roughness Ra of 2.0 μm was used as the current collector 3. Prior to vapor deposition, vacuum evacuation was performed by using the vacuum pump 25 until the interior of the vacuum chamber 10 reached $3 \times 10^{-3}$ Pa. Thereafter, in the vacuum chamber 10, the current collector 3 was moved from the supply roll 11 onto the substrate cooling roll 14 via the pulleys 13, and the current collector 3 was allowed to travel along the substrate cooling roll 14 at a speed of 4 m/min (speed of substrate travel). In the meantime, the evaporation pot 23 containing 200 g of Si raw material 22 was irradiated with electrons from the electron beam radiation system 24, which were accelerated at −10 kV, thus melting and evaporating the Si raw material. The evaporation amount of Si was 0.04 g/sec. On the other hand, oxygen was introduced into the vacuum chamber 10 from the oxygen nozzle 17. At this time, the oxygen nozzle 17 was placed so that the tip of the oxygen nozzle 17 was located at a height of 200 mm from the evaporation pot 23, and that the direction of oxygen emission was aimed toward the current collector 3 traveling along the substrate cooling roll 14 through the gap in the masking plate 5. Moreover, the flow rate of oxygen from the oxygen nozzle 17 was controlled to 1200 sccm by using the oxygen flow rate controller 20. Upon oxygen introduction, the vacuum chamber 10 had a degree of vacuum of $4.5 \times 10^{-2}$ Pa (degree of vacuum during vapor deposition).

In the present Example, the positions of the evaporation pot 23 and the gap in the masking plate 15, the width of the gap in the masking plate 15, and the like were set so that Si atoms would be incident to the traveling current collector 3 from a direction at an angle θ of no less than −13° and no more than +13° with respect to the normal of the current collector 3. The distance between the evaporation pot 23 and the current collector 3 (distance along a direction in which the above angle θ was 0°) was 400 mm.

In this manner, Si atoms and oxygen were supplied to allow silicon oxide to be vapor-deposited on the surface of the current collector 3, thus forming the first active material layer 2. The resultant first active material layer 2 had a thickness of 90 nm. Thereafter, the current collector 30 having the first active material layer 2 formed thereon was wound up onto the take-up roll 12.

Next, by using the vapor deposition apparatus 200 shown in FIG. 6, the active material particles 4 was grown on the first active material layer 2, thus forming the second active material layer 5. Prior to vapor deposition, the vacuum evacuation was performed by using the vacuum pump 25 until the interior of the vacuum chamber 10 reached $3 \times 10^{-3}$ Pa. Thereafter, in the vacuum chamber 10, the current collector 30 was moved from the supply roll 11 onto the substrate cooling roll 14 via the pulleys 13, and the current collector 30 was allowed to travel along the substrate cooling roll 14 at a speed of 1.0 cm/min (speed of substrate travel). In the meantime, the evaporation pot 23 containing 200 g of Si raw material 22 was irradiated with electrons from the electron beam radiation system 24, which were accelerated at −10 kV, thus melting and evaporating the Si raw material. The evaporation amount of Si was 0.04 g/sec. On the other hand, oxygen was introduced into the vacuum chamber 10 from the oxygen nozzle 17. At this time, the oxygen nozzle 17 was placed so that the tip of the oxygen nozzle 17 was located at a height of 200 mm from the evaporation pot 23, and that the direction of oxygen emission was aimed toward the current collector 3 traveling along the substrate cooling roll 14 through the gap in the masking plate 15. Moreover, the flow rate of oxygen from the oxygen nozzle 17 was controlled to 700 sccm by using the oxygen flow rate controller 20. Upon oxygen introduction, the vacuum chamber 10 had a degree of vacuum (degree of vacuum during vapor deposition) of $2.5 \times 10^{-2}$ Pa.

In the present Example, the positions of the evaporation pot 23 and the gap in the masking plate 15, the width of the gap in the masking plate 15, and the like were set so that Si atoms would be incident to the traveling current collector 30 from a direction at an angle θ of no less than 55° and no more than +82° with respect to the normal of the current collector 30. The distance between the evaporation pot 23 and the current collector 30 (distance along a direction in which the above angle θ was 55°) was 435 mm.

In this manner, Si atoms and oxygen were supplied to allow silicon oxide to be vapor-deposited on the surface of the current collector 30, thus forming the second active material layer 5 containing the active material particles 4. Thus, the electrode of Example 1 was obtained. The second active material layer 5 had a thickness of 20 μm.

Note that the thicknesses of the first active material layer 2 and the second active material layer 5 were determined by a measurement method which is described later; the same is also true of the following Example and Comparative Example.

Example 2

With the methods described above with reference to FIG. 8, an electrode for a lithium-ion secondary battery of Example 2 was produced.

In the present Example, the positions of the evaporation pot 23 and the gap between the masking plates 15 and 16 were set so that Si atoms would be incident to the traveling current collector 3 from a direction at an angle θ of no less than 65° and no more than 72° with respect to the normal of the current collector 3, in the active material particle-forming zone 27 of the vapor deposition apparatus 300 shown in FIG. 8. The distance between the evaporation pot 23 and the current collector 3 (distance along a direction in which the above angle θ was 65°) was 550 mm. Furthermore, a gap of 4 mm was provided between the lower substrate 16 and the current collector 3, thus creating the first active material layer formation zone 26 between the lower masking plate 16 and the lower substrate cooling roll 14A.

A specific production method will be described below.

After placing the current collector 3 on the supply roll 11, prior to vapor deposition, vacuum evacuation was performed by using the vacuum pump 25 until the interior of the vacuum chamber 10 reached $3 \times 10^{-3}$ Pa. Thereafter, in the vacuum chamber 10, the current collector 3 was moved from the supply roll 11 onto the upper and lower substrate cooling rolls 14A and 14B via the pulleys 13, and the current collector 3 was allowed to travel along the substrate cooling rolls 14A and 14B at a speed of 1.4 cm/min (speed of substrate travel). A Cu foil (thickness: 40 μm) having a surface roughness Ra of 2.0 μm was used as the current collector 3. In the meantime, the evaporation pot 23 containing 200 g of Si raw material 22 was irradiated with electrons from the electron beam radiation system 24, which were accelerated at −10 kV, thus melting and evaporating the Si raw material. The evaporation amount of Si was 0.06 g/sec.

At the same time, oxygen was introduced from the first oxygen nozzle 17 and the second oxygen nozzle 18 into the vacuum chamber 10. The oxygen flow rate from the first oxygen nozzle 17 was controlled to 100 sccm by using the first oxygen flow rate controller 20, and the flow rate of oxygen from the second oxygen nozzle 18 was controlled to 100 sccm by using the second oxygen flow rate controller 21. The direction of oxygen emission from the first oxygen nozzle 17 was generally perpendicular to the current collector 3 traveling along the substrate cooling roll 14 through the gap in the masking plate 5, and the direction of oxygen emission from the second oxygen nozzle 18 was generally parallel to the current collector 3 traveling along the substrate cooling roll 14 via the gap in the masking plate 5. Moreover, the tips of the first and second oxygen nozzles 17 and 18 were placed at a height of 350 mm from the evaporation pot 23.

The current collector 3 from the supply roll 11 first passed through the first active material layer formation zone 26. Here, at the surface of the current collector 3, the Si atoms having been indirectly supplied through collision or the like reacted with the oxygen having been supplied from the first oxygen nozzle 17 and the second oxygen nozzle 18 to arrive in between the lower masking plate 16 and the lower substrate cooling roll 14, whereby the first active material layer 2 was formed. The first active material layer 2 of the present Example was generally uniformly formed across the entire surface of the current collector 3.

Next, the current collector 3 having the first active material layer 2 formed thereon was moved into the active material particle-forming zone 27. In the active material particle-forming zone 27, the Si atoms emitted from the Si raw material 22 reacted with the oxygen supplied from the first oxygen nozzle 17 and the second oxygen nozzle 18, whereby the second active material layer 5 composed of a plurality of active material particles 4 was formed on the first active material layer 2. In the present Example, as described above, Si atoms were incident to the surface of the current collector 3 from a direction at an angle θ (65°≦θ≦72°) with respect to the normal direction of the current collector 3, and therefore the active material particles 4 grew in a direction which was tilted with respect to the normal direction of the current collector 3.

In the electrode of Example 2 obtained by the above-described methods, the first active material layer 2 had a thickness of 50 nm, and the second active material layer 5 had a thickness of 20 μm. Moreover, the angle between the growth direction of the active material particles 4 and the normal direction of the current collector 3 was about 38°.

Comparative Example

An electrode of Comparative Example was produced by forming a second active material layer directly on the surface of a current collector, without forming a first active material layer. Thus, the construction of the electrode of Comparative Example is similar to the construction described above with reference to FIG. 2. Similarly to Examples 1 and 2, a Cu foil (thickness: 40 μm) having a surface roughness Ra of 2.0 μm was used as the current collector. Formation of the second active material layer was performed by using the vapor deposition apparatus 200 shown in FIG. 6, according to a method and conditions similar to the method and conditions for forming the second active material layer 5 of Example 1. The resultant second active material layer had a thickness of 20 μm.

(Analyses and Evaluations)

Analyses/evaluations of the electrodes of the Examples and Comparative Example obtained with the above-described methods were made. The method and results thereof will be described. Herein, the chemical compositions and thicknesses of the first active material layers and the active material particles in the electrodes of the Examples and Comparative Example were measured. Furthermore, batteries were produced using these electrodes, and measurements and evaluations of their cycle characteristics were made.

1. Chemical Composition

The chemical compositions of the active material particles 4 of Example 1 and Example 2 were measured in the following manner.

First, after forming the active material particles 4, samples for active material particle measurement sized 1 cm×1 cm were cut out, out of the wound-up current collector 3, from a portion on which the active material particles 4 were initially formed during the vapor deposition process (start of film formation) and from a portion on which the active material particles 4 were finally formed (end of film formation).

Next, the Si amounts and the oxygen amounts in such measurement samples were measured with an ICP Atomic Emission Spectrometer and by combustion analysis technique, respectively, and based on average values of the Si amounts and oxygen amounts obtained, a molar ratio (mole fraction of oxygen) "x" of the oxygen amount with respect to the Si amount in the active material particles 4 was calculated.

Note that each sample for active material particle measurement includes the first active material layer 2 in addition to the active material particles 4, and therefore the Si amount and oxygen amount obtained through the measurements would also include the Si amount and oxygen amount within the first active material layer 2. However, since the thickness of the first active material layer 2 is much smaller (1/222) than the thickness of the active material particles 4, the influences of the Si amount and oxygen amount in the first active material layer 2 exerted on the oxygen concentration in the active material particles 4 are very small. Accordingly, in the present Example, the mole fraction of oxygen in each aforementioned sample for active material particle measurement was used as the mole fraction of oxygen "x" of the active material particles 4.

Moreover, the chemical composition of the first active material layers 2 of Example 1 and Example 2 were measured in the following manner.

In Example 1, after forming the first active material layer 2, samples for first active material layer measurement sized 1 cm×1 cm were cut out, out of the current collector 3 before formation of the second active material layer 5, from a portion on which the first active material layer 2 was initially formed during the vapor deposition process for forming the first active material layer 2 (start of film formation) and from a portion on which the first active material layer 2 was finally formed (end of film formation). Thereafter, as in the aforementioned measurement method of the chemical composition of the active material particles 4, the Si amount was measured with ICP Atomic Emission Spectrometry and the oxygen amount was measured by combustion analysis technique in each measurement sample, and based on average values of the Si amounts and oxygen amounts obtained, a molar ratio (mole fraction of oxygen) "y" of the oxygen amount with respect to the Si amount in the first active material layer 2 was calculated.

In Example 2, samples for first active material layer measurement sized 1 cm×1 cm were cut out, out of the current collector 3 after formation of the first active material layer 2 and the second active material layer 5, from a portion on which the first active material layer 2 and the second active material layer 5 were initially formed during the vapor deposition process (start of film formation) and from a portion on which the first active material layer 2 and the second active material layer 5 were finally formed (end of film formation). Then, each sample for first active material layer measurement was subjected to Ar etching to expose the first active material layer 2, and an $Si_{2p}$ binding energy at the exposed surface was measured by using X-ray Photoelectron Spectroscopy (XPS), whereby an average value "y" of the mole fraction of oxygen in the first active material layer 2 was calculated.

Furthermore, with respect to the electrode of Comparative Example, too, the chemical composition of the active material particles was measured with a similar method to the above.

As a result of the aforementioned measurements, it was found that the active material particles 4 of Example 1 had a chemical composition of $SiO_{0.8}$ (x=0.8), and that the active material particles 4 of Example 2 had a chemical composition of $SiO_{0.7}$ (x=0.7). The active material particles of Comparative Example had the same chemical composition as that of Example 1, i.e., $SiO_{0.8}$ (x=0.8).

Moreover, the chemical composition of the first active material layer 2 was $SiO_{1.2}$ (y=1.2) in both Example 1 and Example 2.

2. Thicknesses of the First Active Material Layer and the Second Active Material Layer The thicknesses of the first active material layer 2 and the second active material layer 5 of each Example were determined by using a Marcus radio frequency glow discharge spectrometer from HORIBA on the samples for first active material layer measurement and samples for active material particle measurement of the respective Examples described above. With a similar method, the thickness of the second active material layer of Comparative Example was also calculated.

3. Production of Coin Batteries and Cycle Characteristics Evaluations of the Coin Batteries First, coin batteries were produced by using the electrodes of the Examples and Comparative Example, which were named Cell Samples a, b, and c for evaluation. These Cell Samples had a similar construction to the construction shown in FIG. 7.

Hereinafter, with reference to FIG. 7, a production method for the Cell Samples will be specifically described.

The electrode 6 of Example 1 was each cut out in a circular shape (diameter: 12.5 mm), thus forming an electrode 52 for a coin battery. The electrode 52 for a coin battery was placed so as to oppose a metal-lithium positive electrode (thickness: 300 μm, diameter: 15 mm) 54 via a polyethylene separator (thickness 25 μm, diameter 17 mm) 58, and inserted in a "2016" size coin battery case (total height: 1.6 mm, diameter: 20 mm) 64.

Next, an electrolyte obtained by dissolving a solute of 1M LiPF$_6$ in a 1:1 (volume ratio) mixed solvent of ethylene carbonate and diethyl carbonate was injected into the coin battery case 64. Moreover, in order to fill up the space (shortage of intra-case height) in the case 64, the stainless steel spacer 56 was inserted. Thereafter, a sealing plate 62 having a polypropylene gasket 60 around its periphery was placed on the battery case 64, and the battery case 64 was crimped at the periphery, thus producing Cell Sample a having the electrode of Example 1.

Moreover, with a similar method to the above, Cell Samples b and c having the electrodes of Example 2 and Comparative Example were produced.

Next, charge-discharge capacities of Cell Samples a, b, and c (as two-electrode cells) were measured, and their cycle characteristics were examined. The method and results thereof will be described.

The charge-discharge capacity measurement of each Cell Sample was taken by subjecting the Cell Sample to repetitive charge-discharge cycles, each consisting of charging to 0V with a constant current of 1 mA and discharging to 1.5V with a constant current of 1 mA (constant current charge-discharge method). The ambient temperature during the measurement was room temperature (e.g., 25° C.).

Figure 9:
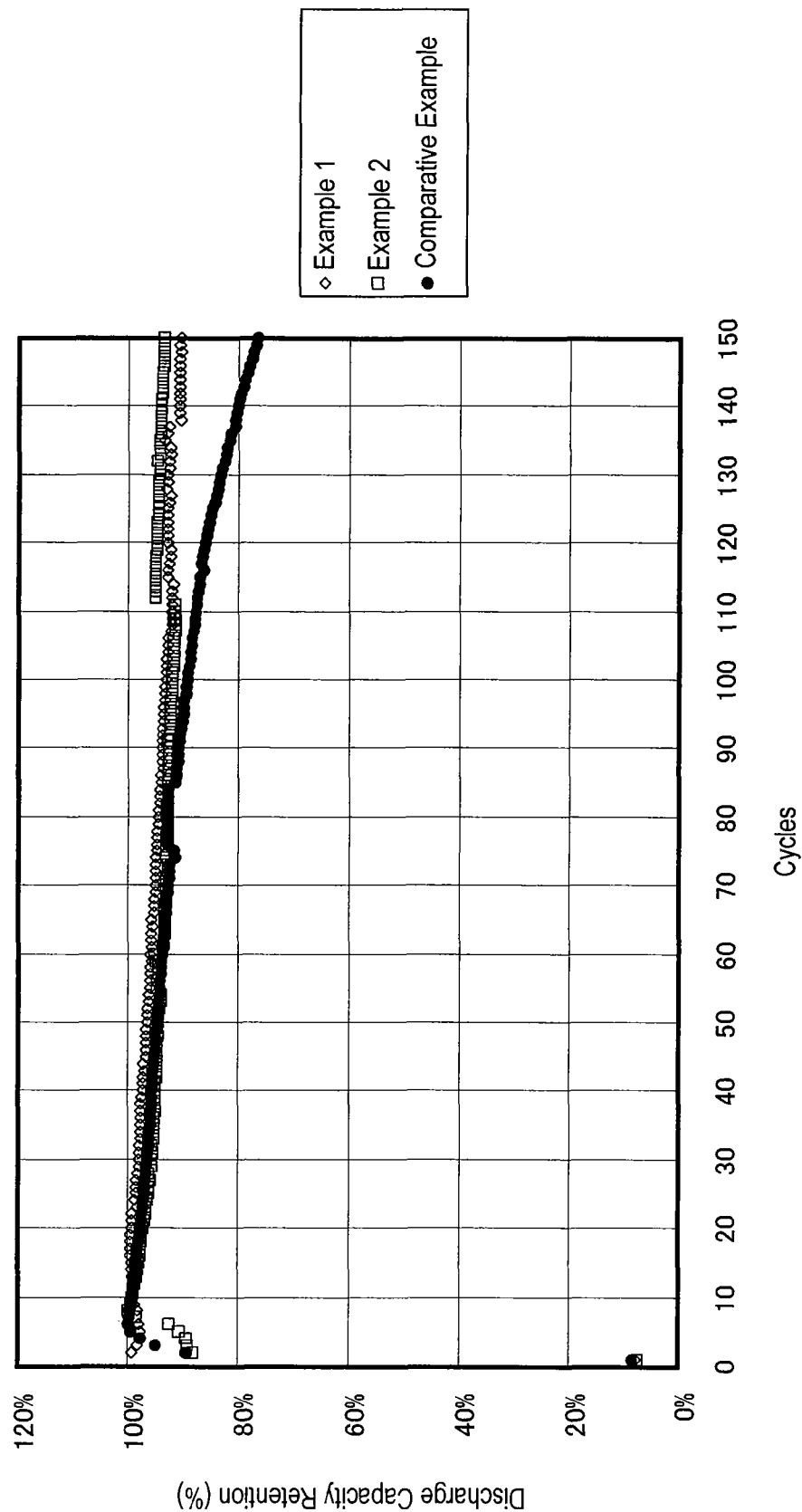
FIG. 9 A graph showing charge-discharge cycle characteristics of coin batteries in which electrodes for a lithium-ion secondary battery according to Examples of the present invention and Comparative Example are used.

The measurement results are shown in FIG. 9. FIG. 9 is a graph showing the charge-discharge cycle characteristics of each Cell Sample, where the horizontal axis of the graph represents the number of cycles (times), and the vertical axis represents the discharge capacity retention (%).

From the results shown in FIG. 9, it has been found that Cell Samples a and b having the electrodes of Examples 1 and 2 maintain a 90% or more capacity of the initial capacity after the lapse of 150 cycles, thus having excellent charge-discharge cycle characteristics. On the other hand, the capacity of Cell Sample c having the electrode of Comparative Example begins to decrease after the lapse of 100 cycles, and lowers down to 80% of the initial capacity after the lapse of 150 cycles. This is presumably because peeling of the active material particles occurred due to expansions and contractions of the active material particles associated with charge and discharge. Therefore, it was confirmed that the charge-discharge cycle characteristics can be improved by providing the first active material layer 2 having a smaller expansion coefficient than that of the active material particles 4 between the active material particles 4 and the current collector 3.

Note that the electrode for a non-aqueous electrolyte secondary battery according to the present invention is also applicable to an electrode for lithium occlusion/release in an electrochemical capacitor. As a result, an electrochemical capacitor having an energy density that cannot be achieved with a conventional graphite electrode can be obtained.

INDUSTRIAL APPLICABILITY

The electrode for a non-aqueous electrolyte secondary battery according to the present invention is applicable to non-aqueous electrolyte secondary batteries such as various lithium-ion secondary batteries, e.g., coin-, cylindrical-, flat-, or cubic-type. These non-aqueous electrolyte secondary batteries have excellent cycle characteristics, and therefore can be broadly used in: mobile information terminals such as PCs, mobile phones, and PDAs; audio-visual devices such as videorecorders, memory audio players; and so on.

The invention claimed is:

1. An electrode for a non-aqueous electrolyte secondary battery comprising: a current collector, wherein, the current collector includes: a plurality of grooves formed on a surface; and a plurality of growth regions partitioned by the plurality of grooves; a first active material layer formed on the current collector; and a second active material layer provided on the first active material layer, the second active material layer provided on the first active material layer, the second active material layer including a plurality of active material particles, wherein, the plurality of active material particles are mainly of a chemical composition represented as SiO$_x$ ($0 \leq x < 1.2$); the first active material layer is mainly of a chemical composition represented as SiO$_y$ ($1.0 \leq y < 2.0$, $y > x$); an area in which the first active material layer is in contact with the plurality of active material particles is smaller than an area in which the current collector is in contact with the first active material layer; and each of the plurality of active material particles is formed on a corresponding growth region with the first active material layer interposed therebetween.

2. The electrode for a non-aqueous electrolyte secondary battery of claim 1, wherein a growth direction of the plurality of active material particles is tilted with respect to a normal direction of the current collector.

3. The electrode for a non-aqueous electrolyte secondary battery of claim 1, wherein the first active material layer and the active material particles go through gradual changes in chemical composition at bonding sites between the first active material layer and the plurality of active material particles.

4. The electrode for a non-aqueous electrolyte secondary battery of claim 1, wherein a ratio s2/s1 of the area s2 in which the first active material layer is in contact with the plurality of active material particles to an area s1 of the first active material layer is no less than 20% and no more than 70%.

5. The electrode for a non-aqueous electrolyte secondary battery of claim 1, wherein the first active material layer has a thickness greater than 2 nm and less than 100 nm.

6. The electrode for a non-aqueous electrolyte secondary battery of claim 1, wherein the current collector has a surface roughness Ra of no less than 0.3 μm and no more than 5 μm.

7. A non-aqueous electrolyte secondary battery comprising:
   a positive electrode capable of occluding and releasing lithium ions;
   the electrode for a non-aqueous electrolyte secondary battery of any of claims 1 to 6;
   a separator disposed between the positive electrode and the electrode for a non-aqueous electrolyte secondary battery; and
   an electrolyte having lithium-ion conductivity.

* * * * *